United States Patent [19]

Cassat et al.

[11] 4,238,591
[45] Dec. 9, 1980

[54] NOVEL COPOLYMERS OF IMIDO MONOMER/HYDROXYLATED ORGANOSILICON COMONOMER

[75] Inventors: Robert Cassat, Ternay; Bruno Vignando, Saint-Fons, both of France

[73] Assignee: Rhone-Poulenc Industries, Paris, France

[21] Appl. No.: 28,893

[22] Filed: Apr. 10, 1979

[30] Foreign Application Priority Data

Apr. 13, 1978 [FR] France ............................ 78 11450

[51] Int. Cl.³ ............................................ C08G 77/04
[52] U.S. Cl. ...................................... 528/27; 428/429; 428/447; 521/95; 521/128; 528/26; 528/28
[58] Field of Search .......................... 528/26, 28, 27; 428/447, 429; 521/95, 128

[56] References Cited

U.S. PATENT DOCUMENTS

| | | | |
|---|---|---|---|
| Re. 29,316 | 7/1977 | Bargain et al. | 260/30.2 |
| 2,444,536 | 7/1948 | Searle | 260/326.5 FM |
| 3,018,290 | 1/1962 | Sauers et al. | 260/326.5 FM |
| 3,297,759 | 1/1967 | Curtiss et al. | 260/570 |
| 4,011,198 | 3/1977 | Takekoshi et al. | 528/28 |
| 4,039,605 | 8/1977 | Koerner et al. | 528/27 |
| 4,075,167 | 2/1978 | Takamizawa et al. | 528/26 |

FOREIGN PATENT DOCUMENTS 823286 9/1969 Canada .
1180795 2/1970 United Kingdom .
1348077 3/1974 United Kingdom .

*Primary Examiner*—Melvyn I. Marquis
*Attorney, Agent, or Firm*—Burns, Doane, Swecker & Mathis

[57] ABSTRACT

Novel copolymers are comprised of oligo-imide/hydroxylated organosilicon comonomers, or of oligo-imide/polyamine/hydroxylated organosilicon comonomers. Such copolymers are useful in the production of coatings and a variety of shaped articles, e.g., molded and/or foamed shaped articles, laminates and the like.

29 Claims, No Drawings

NOVEL COPOLYMERS OF IMIDO MONOMER/HYDROXYLATED ORGANOSILICON COMONOMER

BACKGROUND OF THE INVENTION

1. Field of the Invention

The present invention relates to novel heat-stable polymers comprising imide functions, to a process for the preparation of such polymers, and to various industrial applications thereof, e.g., in the fabrication of laminates.

2. Description of the Prior Art

It is known to this art, according to French Pat. No. 1,555,564, that thermosetting polymers can be obtained by reacting a bis-imide of an unsaturated dicarboxylic acid with a bis-primary diamine. The curing of such polymers under the action of heat provides a certain class of heat-stable resins.

SUMMARY OF THE INVENTION

According to the present invention, novel polymers comprising imide functions have now been developed which possess an improved ageing resistance vis-a-vis the known polymers of related type.

Further advantages of the polymers according to the invention will become apparent from the description which follows.

Briefly, the novel polymers which are the focus of the present invention are characterized as being the reaction product of:

(1) a compound comprising imide functions, which can be either:

(a) an oligo-imide of the structural formula

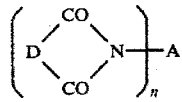
(I)

wherein D is a divalent radical selected from the group comprising those of the formula

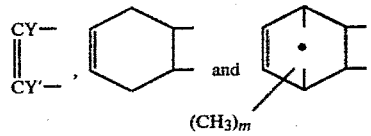

wherein Y and Y', which are identical or different, are each H, CH$_3$ or Cl and m is equal to 0 or 1, the symbol A is an organic radical of valency n, containing up to 50 carbon atoms, and n is a number equal to at least 1.5 and at most 5; or (b) (i) a mixture of an oligo-imide of the general formula (I):

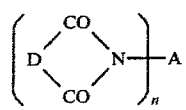
(I)

wherein D, A and n are as defined above, with a polymaine of the general formula (II):

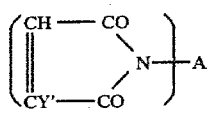
(II)

wherein G is an organic radical of valency z and z is an integer equal to at least 2; or (ii) the product resulting from the reaction between the said oligo-imide (I) and the said polyamine (II); with (2) an organosilicon compound containing, in its molecule, at least one hydroxyl group bonded to a silicon atom.

DESCRIPTION OF THE PREFERRED EMBODIMENTS

The oligo-imides of the present inventions are preferably maleimides of the structural formula:

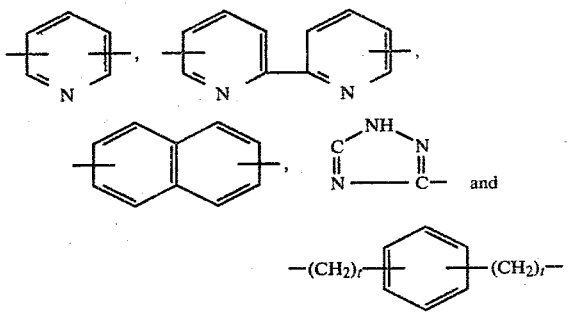
(III)

wherein Y', A and n are defined as above.

In the abovementioned formulae (I) and (III), the symbol A can denote an alkylene radical having fewer than 13 carbon atoms, a phenylene or cyclohexylene radical or one of the radicals of the formulae:

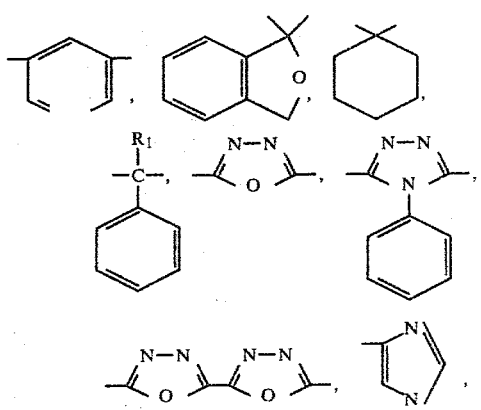

wherein t represents an integer from 1 to 3. The symbol A can also represent a divalent radical having from 12 to 30 carbon atoms, which consists of phenylene or cyclohexylene radicals joined to one another by a single valence bond or by an inert atom or group, such as —O—, —S—, an alkylene group having from 1 to 3 carbon atoms, —CO—, —SO$_2$—, —NR$_1$—, —N=N—, —CONH—, —P(O)—R$_1$—, —COHN—X—NHCO—, -continued

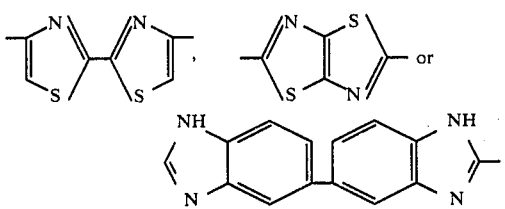

wherein R₁ represents a hydrogen atom, an alkyl radical having from 1 to 4 carbon atoms or a phenyl or cyclohexyl radical and X represents an alkylene radical having fewer than 13 carbon atoms. Moreover, the various phenylene or cyclohexylene radicals can be substituted by groups such as CH₃ and OCH₃, or by a chlorine atom.

The symbol A can also represent a radical which contains up to 50 carbon atoms and possesses from 3 to 5 free valencies. The radical may consist of a naphthalene, pyridine or triazine nucleus, a benzene nucleus which can be substituted by one to three methyl groups, or several benzene nuclei which are joined to one another by an inert atom or group which can be one of those indicated above or also

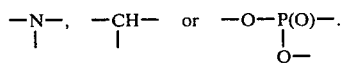

Finally, the symbol A can represent a linear or branched chain alkyl or alkenyl radical which can contain up to 18 carbon atoms, a cycloalkyl radical containing 5 or 6 carbon atoms in the ring, a mono- or bi-cyclic aryl radical or an alkyl aryl or aralkyl radical, containing up to 18 carbon atoms, or one of the radicals:

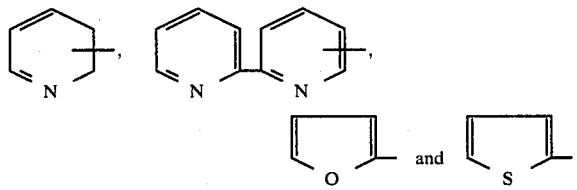

or a monovalent radical consisting of a phenyl radical and a phenylene radical, which are joined to one another by a single valence bond or by an inert atom or group such as —O—, —S—, an alkylene radical having from 1 to 3 carbon atoms, —CO—, —SO₂—, —NR₁—, —N=N—, —CONH—, —COO— or —COOR₁, in which R₁ has the meaning indicated above. Moreover, these various radicals can be substituted by atoms, radicals or groups such as —F, —Cl, —CH₃, —OCH₃, —OC₂H₅, —OH, —NO₂, —COOH,

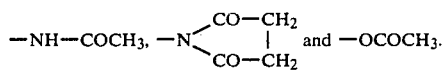

It is apparent from the foregoing that the maleimide constituent which is preferably selected for carrying out the present invention can be a specific polymaleimide or a mixture containing maleimides of different functionalities. In the particular case where a mixture comprising a monomaleimide is used, the proportion of the monomaleimide in the mixture is preferably such that the number of maleimide functions provided by the monomaleimide does not represent more than 30% of the total number of maleimide functions employed in the reaction.

The maleimide of the formula (III) is, preferably, a bis-imide such as, for example: N,N'-ethylene-bis-maleimide; N,N'-hexamethylene-bis-maleimide; N,N'-meta-phenylene-bis-maleimide; N,N'-para-phenylene-bis-maleimide; N,N'-4,4'-biphenylene-bis-maleimide; N,N'-4,4'-diphenylmethane-bis-maleimide; N,N'-4,4'-(diphenyl ether)-bis-maleimide; N,N'-4,4'-(diphenyl sulfide)-bis-maleimide; N,N'-4,4'-diphenylsulfone-bis-maleimide; N,N'-4,4'-dicyclohexylmethane-bis-maleimide; N,N'-α,α'-4,4'-dimethylenecyclohexane-bis-maleimide; N,N'-meta-xylylene-bis-maleimide; N,N'-para-xylylene-bis-maleimide; N,N'-4,4'-(1,1-diphenylcyclohexane)-bis-maleimide; N,N'-4,4'-diphenylmethane-bis-chloromaleimide; N,N'-4,4'-(1,1-diphenylpropane)-bis-maleimide; N,N'-4,4'-(1,1,1-triphenylethane)-bis-maleimide; N,N'-4,4'-triphenylmethane-bis-maleimide; N,N'-3,5-triazole-1,2,4-bis-maleimide; N,N'-dodecamethylene-bis-maleimide; N,N'-(2,2,4-trimethylhexamethylene)-bis-maleimide; N,N'-4,4'-diphenylmethane-bis-citraconimide; 1,2-bis-(2-maleimidoethoxy)-ethane; 1,3-bis-(3-maleimidopropoxy)-propane; N,N'-4,4'-benzophenone-bis-maleimide; N,N'-pyridine-2,6-diyl-bis-maleimide; N,N'-naphthylene-1,5-bis-maleimide; N,N'-cyclohexylene-1,4-bis-maleimide; N,N'-5-methylphenylene-1,3-bis-maleimide or N,N'-5-methoxyphenylene-1,3-bis-maleimide.

These bis-imides can be prepared by utilizing those methods described in, for example, U.S. Pat. No. 3,018,290 and British Pat. No. 1,137,592.

The following are specific examples of the monomaleimides within the ambit of the invention: N-phenyl-maleimide; N-phenyl-methylmaleimide; N-phenyl-chloromaleimide; N-p-chlorophenyl-maleimide; N-p-methoxyphenyl-maleimide; N-p-methylphenyl-maleimide; N-p-nitrophenyl-maleimide; N-p-phenoxyphenyl-maleimide; N-p-phenylaminophenyl-maleimide; N-p-phenoxycarbonylphenyl-maleimide; 1-maleimido-4-acetoxysuccinimido-benzene; 4-maleimido-4'-acetoxysuccinimido-diphenylmethane; 4-maleimido-4'-acetoxysuccinimido-diphenyl ether; 4-maleimido-4'-acetamido-diphenyl ether; 2-maleimido-6-acetamido-pyridine; 4-maleimido-4'-acetamido-diphenylmethane and N-p-phenylcarbonylphenyl-maleimide.

These mono-imides can be prepared by utilizing the method described in U.S. Pat. No. 2,444,536 for the preparation of N-aryl-maleimide.

Examples of maleimide (III) are the oligomers comprising imide functions having the structural formula:

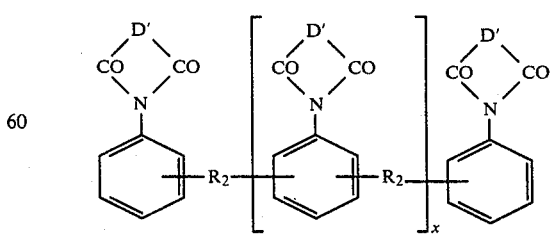

wherein X represents a number ranging from about 0.1 to 2, the symbol R₂ represents a divalent hydrocarbon radical having from 1 to 8 carbon atoms, which is derived from an aldehyde or ketone of the general formula:

in which the oxygen is bonded to a carbon atom of the radical $R_2$, and the symbol D' represents a divalent organic radical possessing from 2 to 24 carbon atoms, the valencies of which are borne by adjacent carbon atoms and which is derived from an internal anhydride of the structural formula:

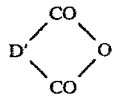

a proportion of at least about 60% of the radicals D' representing a radical of the formula:

in which the symbol Y has the meaning given above, whereby the radicals D' which may remain can represent, in particular, an alkylene, cycloalkylene, or carbocyclic or heterocyclic aromatic radical. The preparation of these oligomers comprising imide functions is described in German Patent Application No. 2,230,874.

As regards the polyamine of the general formula $G(NH_2)_z$, a bis-primary diamine of the general formula: $H_2N-Q-NH_2$ (IV), in which the symbol Q can represent one of the divalent radicals represented by the symbol A, is noted as being preferred.

By way of illustration of the polyamines which are representative of those within the scope of the invention, there are mentioned: 4,4'-diaminodicyclohexylmethane; 1,4-diaminocyclohexane; 2,6-diaminopyridine; meta-phenylenediamine; para-phenylenediamine; 4,4'-diaminodiphenylmethane; 2,2-bis-(4-aminophenyl)-propane; benzidine; 4,4'-diaminodiphenyl ether; 4,4'-diaminodiphenyl sulfide; 4,4'-diaminodiphenylsulfone; bis-(4-aminophenyl)-methylphosphine oxide; bis-(4-aminophenyl)-phenylphosphine oxide; N,N-(4-aminophenyl)-methylamine; 1,5-diaminonaphthalene; meta-xylylenediamine; paraxylylenediamine; 1,1-bis-(para-aminophenyl)-phthalane; hexamethylenediamine; 6,6'-diamino-2,2'-bipyridyl; 4,4'-diaminobenzophenone; 4,4'-diaminoazobenzene; bis-(4-aminophenyl)-phenylmethane; 1,1-bis-(4-aminophenyl)-cyclohexane; 1,1-bis-(4-amino-3-methylphenyl)-cyclohexane; 2,5-bis-(m-aminophenyl)-1,3,4-oxadiazole; 2,5-bis-(p-aminophenyl)-1,3,4-oxadiazole; 2,5-bis-(m-aminophenyl)-thiazolo[4,5-d]thiazole; 5,5'-di-(m-aminophenyl)-bis-(1,3,4-oxadiazolyl-2,2'); 4,4'-bis-(p-aminophenyl)-2,2'-bithiazole; m-bis-[4-(p-aminophenyl)-thiazol-2-yl]-benzene; 2,2'-bis-(m-aminophenyl)-5,5'-bibenzimidazole; 4,4'-diaminobenzanilide; phenyl-4,4'-diaminobenzoate; N,N'-bis-(4-aminobenzoyl)-p-phenylenediamine; 3,5-bis-(m-aminophenyl)-4-phenyl-1,2,4-triazole; 4,4'-[N,N'-bis-(p-aminobenzoyl)-diamino]-diphenylmethane; bis-p-(4-aminophenoxycarbonyl)-benzene; bis-p-(4-aminophenoxy)-benzene; 3,5-diamino-1,2,4-triazole; 1,1-bis-(4-aminophenyl)-1-phenylethane; 3,5-bis-(4-aminophenyl)-pyridine; 1,2,4-triaminobenzene; 1,3,5-triaminobenzene; 2,4,6-triaminotoluene; 2,4,6-triamino-1,3,5-trimethylbenzene; 1,3,7-triaminoaphthalene; 2,4,4'-triaminobiphenyl; 2,4,6-triaminopyridine; 2,4,4'-triaminodiphenyl ether; 2,4,4'-triaminodiphenylmethane; 2,4,4'-triaminodiphenylsulfone; 2,4,4'-triaminobenzophenone; 2,4,4'-triamino-3-methyldiphenylmethane; N,N,N-tris-(4-aminophenyl)-amine; tris-(4-aminophenyl)-methane' 4,4',4''-triaminotriphenyl orthophosphate; tris-(4-aminophenyl)-phosphine oxide; 3,5,4'-triaminobenzanilide; melamine; 3,5,3',5'-tetraaminobenzophenone; 1,2,4,5-tetraaminobenzene; 2,3,6,7-tetraaminonaphthalene; 3,3'-diaminobenzidine; 3,3',4,4'-tetraaminodiphenyl ether; 3,3'4,4'-tetraaminodiphenylmethane; 3,3',4,4'-tetraaminodiphenylsulfone; 3,5-bis-(3,4-diaminophenyl)-pyridine; and the oligomers of the structural formula:

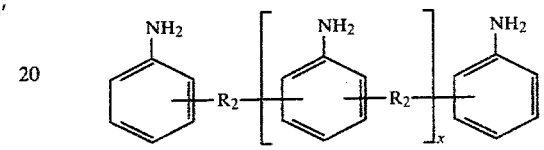

in which $R_2$ and x have the meanings given above. These oligomers with amine groups can be obtained in accordance with known processes, such as those which are described in French Pat. Nos. 1,430,977, 1,481,935 and 1,533,696.

The hydroxylic organosilicon compounds which fall within the scope of the invention are known compounds which correspond to the following general formula (V):

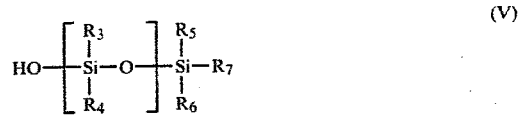

wherein $R_3$, $R_4$, $R_5$, $R_6$ and $R_7$, which are identical or different, represent: a hydroxyl group or a group of the type $-OR_8$, in which $R_8$ can be a linear or branched chain alkyl radical having from 1 to 6 carbon atoms or a phenyl radical; a hydrogen atom; a linear or branched chain alkyl radical which has from 1 to 6 carbon atoms and which can be optionally substituted by one or more chlorine or fluorine atoms or by the group $-CN$; a linear or branched chain alkenyl radical having from 1 to 6 carbon atoms; or a phenyl radical which is optionally substituted by one or more alkyl and/or alkoxy radicals having from 1 to 4 carbon atoms, or by one or more chlorine atoms; and y is an integer or fraction from 0 to 1,000.

For a specific organosilicon compound of the formula (V), y is in reality always an integer. However, as these are compounds of polymeric structure in this case (when y is greater than 1), there is rarely a single compound but most frequently a mixture of compounds of the same chemical structure, which differ in the number of repeating units in the molecule. This results in a mean value of y which can be an integer or a fraction.

The hydroxylic organosilicon compounds of the abovementioned type can be characterized by the ratio of the weight of the hydroxyl groups which they possess to the total weight of their molecule.

The organosilicon compounds which are preferably used for carrying out the present invention are the above-mentioned compounds in which the weight ratio of the hydroxyl groups in the molecule is equal to at least 0.0005 and preferably at least 0.001.

Among the organosilicon compounds belonging to this preferred group, very particularly suitable are compounds of the formula (V) in which: $R_3$, $R_4$, $R_5$ and $R_6$, which are identical or different, represent linear or branched chain alkyl radicals having 1 to 6 carbon atoms, linear or branched chain alkenyl radicals having 1 to 6 carbon atoms, or phenyl radicals; $R_7$ represents a hydroxyl group; and y is an integer or fraction from 0 to 250.

These compounds are therefore silanediols when y is equal to 0 or, alternatively, polysiloxanediols when y is greater than 0. For their preparation, reference may be made to the work of W. Noll, *Chemistry and Technology of Silicones*, (English translation of the German edition of 1968), published by Academic Press of New York.

The organosilicon compounds which are very particularly suitable for use in the present invention are selected from the group comprising: diethylsilanediol; diphenylsilanediol; methylphenylsilanediol; 1,1,3,3-tetramethyldisiloxane-1,3-diol; 1,1-dimethyl-3,3-diphenyldisiloxane-1,3-diol; 1,3-dimethyl-1,3-diphenyldisiloxane-1,3-diol; 1,1,3,3,5,5-hexamethyltrisiloxane-1,5-diol; 1,1,3,3,5,5,7,7-octamethyltetrasiloxane-1,7-diol; 1,1,3,3,5,5,7,7,9,9-decamethylpentasiloxane-1,9-diol; 1,1,3,3,5,5,7,7,9,9,11,11-dodecamethylhexasiloxane-1,11-diol; 1,3,5,7,9-pentamethyl-1,3,5,7,9-pentaphenylpentasiloxane-1,9-diol; and also their corresponding higher homologues.

The hydroxylic organosilicon compounds which are very particularly suitable can also be mixtures of two or more of the above-mentioned compounds. Thus, commercial hydroxylic polysiloxane oils or resins can conveniently be used. These are, in particular, α,ω-dihydroxylic polymethylpolysiloxane oils having from 0.2 to 0.3% by weight of hydroxyl groups (for example, 48 V 500 oil from Rhone-Poulenc) or 10 to 12% by weight of hydroxyl groups (for example 48 V 50 oil from Rhone-Poulenc) or α,ω-dihydroxylic methylphenylpolysiloxane oils or resins having 4.5% to 5% by weight of hydroxyl groups (for example, 50606 oil from Rhone-Poulenc) or from 7.5 to 8.5% by weight of hydroxyl groups (for example, 50305 resin from Rhone-Poulenc). These commercial oils or resins are given by way of example, but others exist which are equally suitable.

For the preparation of the polymers according to the invention, it must be understood that it is possible to use a mixture of oligo-imides as well as a mixture of hydroxylic organosilicon compounds. Likewise, the term polyamine can also denote mixtures of polyamines of the same functionally or, alternatively, mixtures of polyamines of which at least two possess different functionalities. One or more bis-primary diamines are generally used, optionally in combination with one or more polyamines of higher functionality, which can represent up to 50% by weight of the weight of the diamines employed.

In the description of the invention, the term oligo-imide, the term polyamine and ther term hydroxylic organosilicon compound therefore encompass not only each compound of this type but also mixtures of oligo-imides, of polyamines or of hydroxylic organosilicon compounds.

When the polymers according to the invention are prepared from an oligo-imide (I) and a hydroxylic organosilicon compound (V) (hereinafter referred to as variant 1), the amounts of reactants are selected so as to provide the weight ratio:

$$\frac{\text{hydroxylic organosilicon compound}}{\text{oligo-imide + hydroxylic organosilicon compound}}$$

of between 0.05 and 0.08. Preferably, a weight ratio of between 0.1 and 0.5 is employed.

Another means for defining the relative proportions of oligo-imide and hydroxylic organosilicon compound (in variant 1) consists in indicating the ratio of the number of hydroxyl functions in the organosilicon compound to the number of imide groups in the oligo-imide:

$$\frac{\text{number of hydroxyl functions in the organosilicon compound}}{\text{number of imide groups in oligo-imide.}}$$

This ratio is generally between 0.0003 and 10 and is preferably between 0.001 and 2.

When the polymers according to the invention are prepared from an oligo-imide (I), a polyamine (II) and a hydroxylic organosilicon compound (V) (hereinafter referred to as variant 2), the amounts of reactants used are such that there is a weight ratio:

$$\frac{\text{hydroxylic organosilicon compound}}{\text{oligo-imide + polyamine + hydroxylic organosilicon compound}}$$

of between 0.05 and 0.08. This weight ratio is usually between 0.1 and 0.5.

Alternatively, the relative proportions of the reactants (in variant 2) may be defined in terms of the ratio of their functional groups. Thus, the numerator is the number of hydroxyl functions in the hydroxylic organosilicon compound plus the number of amine functions in the polyamine, and the denominator is the number of imide groups in the oligo-imide:

$$\frac{\text{(number of hydroxyl functions in the organosilicon compound} + \text{number of amine functions in the polyamine)}}{\text{number of imide groups in the oligo-imide.}}$$

Generally, this ratio is between 0.1 and 10, and is preferably between 0.2 and 4.

In the case of variant 2, the proportion of the hydroxy functions in the hydroxylic organosilicon compound to the amine functions in the polyamine of variant 2 are such that the ratio $$\frac{\text{number of hydroxyl functions}}{\text{number of amine functions}}$$

is between 0.005 and 40, and preferably between 0.01 and 10.

The polymers according to the invention can be prepared in bulk by heating the mixture of reactants, at least until a homogeneous liquid is obtained. In the case of variant 1 the mixture consists of an oligo-imide (I), as defined above, and a hydroxylic organosilicon compound (V), as defined above. In the case of variant 2 the mixture consists of an oligo-imide (I), a polyamine (II), as defined above, and a hydroxylic organosilicon compound (V). In the following text, these mixtures will be denoted by the expression "mixture of the reactants". Before heating the mixture of the reactants, it is advantageously homogenized.

The reaction temperature can vary within fairly wide limits, as a function of the nature and the number of reactants present, but, as a general rule, it is between 50° C. and 300° C.

The polymers according to the present invention can also be prepared by heating the mixture of the reactants in an organic diluent which is liquid in at least part of the range of 50°–300° C. thereby forming a solution or suspension of the polymers. Among these diluents, there are mentioned, in particular: aromatic hydrocarbons, such as xylenes and toluene; halogen hydrocarbons, such as chlorobenzenes; ethers, such as dioxane, tetrahydrofuran and dibutyl ether; dimethylformamide; dimethylsulfoxide; N-methylpyrrolidone; N-vinylpyrrolidone; methylglycol; and methyl ethyl ketone.

The solutions or suspensions of polymers can be used as obtained for numerous purposes. The polymers can also be isolated, for example by filtration, after precipitation by means of an organic diluent which is miscible with the solvent used. In this context, a hydrocarbon having a boiling point which does not substantially exceed 120° C. can advantageously be used.

However, the polymers of the present invention can also be prepared in the form of prepolymers (P) having a softening point at a temperature below 250° C. (in general, this softening point is between 50° and 200° C.). The softening point of a polymer is regarded as the approximate temperature at which a glass rod can easily be pushed a few millimeters into the polymer. These polymers can be obtained in bulk by heating the mixture of the reactants, until a homogeneous or pasty product is obtained, at a temperature which is generally between 50° and 200° C. The prepolymers can also be prepared in suspension or in solution, in a diluent which is liquid in at least part of the range 50°–200° C.

It must be noted that, according to a preferred embodiment of the invention, it is possible, in the case of variant 2, to form a preliminary prepolymer (PP) from all or part of the oligo-imide and of the polyamine in the proportion of 1.2 to 5 imide groups per amine function. This preliminary prepolymer (PP), having a softening point which is generally between 50° and 200° C., is then mixed with the hydroxylic organosilicon compound and, if appropriate, with the remaining oligo-imide and polyamine in order to obtain the prepolymer (P).

The prepolymers (P) can be used in the form of a liquid mass, whereby simple hot casting suffices to shape and produce molded articles. It is also possible, after cooling and grinding, to use them in the form of powders which are remarkably suitable for compression-molding operations, optionally in the presence of fillers in the form of powders, spheres, granules, fibers or flakes. In the form of suspensions or solutions, the prepolymers (P) can be used to produce coatings and pre-impregnated intermediate articles of which the reinforcement can consist of fibrous materials based on aluminium silicate or oxide or zirconium silicate or oxide, carbon, graphite, boron, asbestos or glass. These prepolymers (P) can also be used to produce cellular materials after incorporation of a pore-forming agent such as azodicarbonamide.

In a second stage, the prepolymers (P) can be cured by heating up to temperatures which are of the order of 350° C. and generally between 150° and 300° C. A complementary shaping can be carried out during curing, either in vacuo or under pressure above atmospheric pressure. It is also possible for these operations to be consecutive. The curing can be carried out in the presence of a free-radical polymerization initiator, such as lauroyl peroxide or azo-bis-isobutyronitrile, or in the presence of an anionic polymerization catalyst, such as diazabicyclooctane.

The polymers according to the invention are of value in those industrial fields which require materials possessing good mechanical and electrical properties and also a high stability at temperatures of the order of 200° to 300° C.

It will be noted very particularly that the polymers according to the invention possess a higher temperature index than that corresponding to the polymers of the prior art, such as, for example, the polyimides described in French Pat. No. 1,555,564 mentioned above. The temperature index of a material is regarded as the temperature at which it retains, after 20,000 hours, mechanical properties which have a value equal to 50% of the initial value of the said properties.

The new polymers according to the invention are further distinguished by considerably improved properties in what is normally a sensitive area, namely the dimensional and weight stability of the polymers with imide groups in an aqueous medium.

All these advantages, which are in no way limited by the above list, show the great value offered by the polymers described in the present invention.

They can be used in the most diverse forms, such as molded articles, laminates, paints, films, coatings and the like. Their applications in fields as varied as the electrical or mechanical industries and the fields of electrical insulation, heating by radiation, convection or conduction, and impregnated circuits, result from the advantages provided by their properties.

In order to further illustrate the present invention and the advantages thereof, the following specific examples are given, it being understood that same are intended only as illustrative and in nowise limitative.

EXAMPLE 1

A prepolymer comprising imide functions was prepared from a mixture of N,N'-4,4'-diphenylmethane-bis-maleimide and 4,4'-diamino-diphenylmethane, the mixture containing 2.5 imide functions per amine function by heating the mixture of reactants for 20 minutes at 160° C. After cooling, the prepolymer obtained was ground and dissolved in N-methylpyrrolidone (NMP).

Subsequently, 165 g of a methylated, hydroxylated polysiloxane oil containing 0.2% by weight of hydroxyl groups (48 V 500" oil from Rhone-Poulenc), were added to a solution of 655 g of the prepolymer prepared above in 1000 g of N-methylpyrrolidone. A solution (or collodion) containing 55% by weight of NMP and 45% by weight solute (36% by weight of prepolymers comprising imide functions and 9% of hydroxylated polysiloxane) was thus obtained.

This collodion was deposited with a brush on both face surfaces of a glass fabric (a cloth weighing 200 grams per square meter treated with "A 1100 finish" (surface treatment provided the cloth by the fabric manufacturer), so as to provide a weight ratio of glass fabric/(prepolymer comprising imide functions + polysiloxane mixture) equal to 65/35. The collodion was deposited in two passes which were separated by a drying step carried out for 1 minute at 140° C. After the second pass, the drying was carried out for 14 minutes at 140° C. in a very well ventilated oven.

The "prepreg" thus obtained was used to prepare laminates, as follows:

(a) 12-ply laminate (12 layers of prepreg): The plies were heated at 160° C. for 6 minutes and were then compressed for 15 minutes at 160° C. under a pressure of 60 bars and finally compressed for 75 minutes at 180° C. also under a pressure of 60 bars. Baking in a ventilated oven was then carried out for 24 hours at 200° C. The proportion of resin in the laminate was 22.5% by weight;

(b) 40-ply laminate (40 layers of prepreg): The plies were heated for 8 minutes at 160° C. and were then compressed for 15 minutes at 160° C. under a pressure of 60 bars and finally compressed for 75 minutes at 180° C. also under a pressure of 60 bars. Baking was next carried out for 24 hours at 200° C. in a ventilated oven. The proportion of resin in the laminate was 24.6% by weight.

Mechanical properties were determined on the 12-ply laminate and on a control 12-ply laminate, prepared from the same glass fabric but using only the prepolymer comprising imide functions prepared as above (proportion of resin in this control laminate=30.1% by weight), are summarized in the following Table I.

The measurements were carried out at ambient temperature (about 20° C.), after baking, in accordance with ASTM Standard Specification D 790.

TABLE I

| TESTS | DETERMINATIONS | |
|---|---|---|
| Laminate: 12-ply with the combination according to the invention | Flexural strength ($kg/mm^2$) | 57.3 |
| | Flexural modulus ($kg/mm^2$) | 3,050 |
| Laminate: 12-ply Control | Flexural strength ($kg/mm^2$) | 59.0 |
| | Flexural modulus ($kg/mm^2$) | 2,682 |

These same measurements were also carried out at 250° C. as above, and the results thereof are reported in the following Table II:

TABLE II

| TESTS | DETERMINATIONS | TEST PERIOD AT 250° C. | | |
|---|---|---|---|---|
| | | 0 h | 1000 h | 2500 h |
| Laminate: 12-ply with the combination according to the invention | Flexural strength ($kg/mm^2$) | 24.0 | 22.3 | 8.5 |
| | Flexural modulus ($kg/mm^2$) | 2,080 | 2,130 | 1,520 |
| Laminate: 12-ply | Flexural strength ($kg/mm^2$) | 32.0 | 26.0 | 15.9 |
| Control | Flexural modulus ($kg/mm^2$) | 1,889 | 1,428 | 1,268 |

EXAMPLE 2

655 g of prepolymer comprising imide functions, prepared as in Example 1, were added to a solution of 165 g of diphenylsilanediol (containing 15.7% by weight of hydroxyl groups) in 1,000 g of N-methylpyrrolidone (NMP).

The viscosity of this solution (or collodion) was 0.65 poise and did not change when the collodion was stored for 48 hours at ambient temperature (about 20° C.).

This collodion was deposited with a brush on both face surfaces of a glass fabric (a satin weighing 300 $g/m^2$, treated with "A 1100 finish"). The coating was carried out utilizing the formulation 35/65 (35% by weight of resin and 65% by weight of glass fabric) in two passes which were separated by a drying step carried out for 1 minute at 170° C. The total drying time was 16 minutes at 170° C. in a ventilated oven. The prepreg obtained above was used to produce laminates by compression for 1 hour at 180° C. under a pressure of 40 bars, followed by baking for 24 hours at 200° C.

A 21-ply laminate containing a proportion of resin of 32.0%, a 12-ply laminate containing a proportion of resin of 26.5% and an 8-ply laminate containing a proportion of resin of 28.0% were thus prepared.

The mechanical properties were determined on the 12-ply laminate and also on a control 12-ply laminate prepared from the same glass fabric (a satin weighing 300 $g/m^2$) coated using only the prepolymer comprising imide functions (proportion of resin: 28.8% by weight).

The measurements were carried out at 180° C. (ASTM Standard Specification D 790) for various aging times at 180° C. (see Table III below):

TABLE III

| TESTS | DETERMINATIONS | AGING TIME at 180° C. | | | | |
|---|---|---|---|---|---|---|
| | | 0 hour | 5,000 hours | 10,000 hours | 15,000 hours | 20,000 hours |
| 12-ply laminate with combination according to the invention | Flexural strength ($kg/mm^2$) | 47.5 | 46.9 | 37.7 | 34.4 | 33.9 |
| | Flexural modulus ($kg/mm^2$) | 2,440 | 2,200 | 2,098 | 2,094 | 2,125 |
| 12-ply laminate Control | Flexural strength ($kg/mm^2$) | 49.7 | 48.7 | 39.8 | 28.3 | 18.5 |
| | Flexural modulus ($kg/mm^2$) | 2,389 | 2,520 | 2,346 | 2,215 | 2,170 |

The electrical properties were determined on the 8- and 21-ply laminates (see results in Table IV):

TABLE IV

| Electrical Properties Measured | Initial values | After 24 hours in water |
|---|---|---|
| Dielectric strength (in kV/mm) | 19 | 17 |
| Dielectric constant at 1MHz, $\epsilon$ | 5 | 5 |
| Tangent of the loss angle at 1MHz | $4 \times 10^{-3}$ | $5 \times 10^{-3}$ |

The behavior of the 21-ply laminate in boiling water was determined by measuring the dimensions and the weight of the sample after residence times of 24 hours, 500 hours, 1,000 hours and 1,500 hours. By way of comparison, a control laminate of the same thickness, prepared only from the prepolymer comprising imide functions on the same support fabric, was subjected to the same tests (Table V):

TABLE V

DIMENSIONAL AND WEIGHT STABILITES
(in % variation relative to the initial values)

| TESTS | After 24 hours | | | | After 500 hours | | | |
|---|---|---|---|---|---|---|---|---|
| | Δl | Δw | Δt | ΔW | Δl | Δw | Δt | ΔW |
| 21-ply laminate with the combination according to the invention | +0.028 | +0.100 | +0.45 | +0.47 | +0.028 | +0.039 | +0.45 | +1.31 |
| Control laminate of the same thickness | +0.038 | +0.079 | +0.49 | +0.69 | +0.155 | +0.177 | +1.23 | +1.79 |

| TESTS | After 1,000 hours | | | | After 1,500 hours | | | |
|---|---|---|---|---|---|---|---|---|
| | Δl | Δw | Δt | ΔW | Δl | Δw | Δt | ΔW |
| 21-ply laminate with the combination according to the invention | +0.028 | +0.039 | +0.45 | +1.59 | +0.028 | +0.039 | +0.45 | +1.74 |
| Control laminate of the same thickness | +0.10 | +0.196 | +2.71 | +2.40 | | | | |

Δl = Variation in % relative to the initial length
Δw = Variation in % relative to the initial width
Δt = Variation in % relative to the initial thickness
ΔW = Variation in % relative to the initial weight The behavior on exposure to fire, in accordance with UL Standard Specification 94 (of UNDERWRITERS LABORATORIES), described in document BNMP 9750 of the Bureau de Normalisation des Matières Plastiques, of laminates having a thickness of 0.7 mm and 1.4 mm, prepared as previously indicated in the present example, resulted in a classification of 94 V 1, regardless of the thickness and the conditioning.

EXAMPLE 3

655 g of prepolymer comprising imide functions, prepared in accordance with the method described in Example 1, were added to a solution of 165 g of α,ω-dihydroxylic methylphenylpolysiloxane oil containing 4.8% by weight of hydroxyl functions ("50 606" oil from Rhone-Poulenc) in 1,000 g of N-methylpyrrolidone (NMP).

The viscosity of the collodion thus obtained was 0.56 poise and was stable with time.

This collodion was deposited with a brush on both face surfaces of a glass fabric (a satin weighing 300 g/m², treated with "A 1100 finish"). The coating was carried out by utilizing the formulation 35/65 (35% by weight of resin and 65% by weight of glass fabric) in two passes which were separated by a drying step carried out for 1 minute at 180° C. The final drying was carried out for 9 minutes at 180° C. in a ventilated oven.

12- and 20-ply laminates were produced from the prepeg obtained as above by compression for 1 hour at 180° C. under pressure of 40 bars, followed by baking for 24 hours at 200° C.

A 12-ply laminate containing 26.6% by weight of resin and a 20-ply laminate containing 20.9% by weight of resin were thus prepared.

The mechanical properties were determined on the 12-ply laminate and also on a control laminate prepared from the same glass fabric (a satin weighing 300 g/m²) coated using only the prepolymer comprising imide functions (proportion of resin: 28.8% by weight).

The measurements were carried out at 180° C. (ASTM Standard Specification D 790) for various ageing times at 180° C. (Table VI below):

TABLE VI

| TESTS | DETERMIN-ATIONS | AGEING TIME AT 180° C. | | | | |
|---|---|---|---|---|---|---|
| | | 0 hour | 5,000 hours | 10,000 hours | 15,000 hours | 20,000 hours |
| 12-ply laminate with combination according to the invention | Flexural strength (kg/mm²) | 51.9 | 47.4 | 45.7 | 35.8 | 33.1 |
| | Flexural modulus (kg/mm²) | 2,694 | 2,654 | 2,710 | 2,608 | 2,445 |
| 12-ply laminate Control | Flexural strength (kg/mm²) | 49.7 | 48.7 | 39.8 | 28.3 | 18.5 |
| | Flexural modulus (kg/mm²) | 2,389 | 2,520 | 2,346 | 2,215 | 2,170 |

Measurements carried out at 200° C. on the 12-ply laminate prepared with the combination according to the invention gave the following initial values (time 0):
Flexural strength at 200° C.: 45.1 kg/mm²
Flexural modulus at 200° C.: 2,685 kg/mm².

Certain electrical properties were also determined on the 20-ply laminate and a second series of measurements of these properties was then carried out after having left the laminate in water for 24 hours (see Table VII below):

TABLE VII

| Electrical properties measured | Initial values | After 24 hours in water |
|---|---|---|
| Dielectric strength (in kV/mm) | 21 | 20 |
| Volume resistivity $\Omega$ cm | $1 \times 10^{15}$ | $2 \times 10^{14}$ |
| Dielectric constant at 1MHz: $\epsilon$ | 5 | 5 |
| Tangent of the loss angle at 1MHz | $6.1 \times 10^{-3}$ | $6.9 \times 10^{-3}$ |

In boiling water, the stability of the 20-ply laminate prepared above was determined by measuring the dimensions and the weight of the sample after residence times of 24 hours, 1,000 hours and 1,700 hours. By way of comparison, a control laminate of the same thickness was prepared on the same support fabric, but using only the prepolymer comprising imide functions, and was subjected to the same tests (see Table VIII below):

TABLE VIII
DIMENSIONAL AND WEIGHT STABILITES
(in % variation relative to the initial values)

| TESTS | After 24 hours | | | | After 500 hours | | | |
|---|---|---|---|---|---|---|---|---|
| | $\Delta l$ | $\Delta w$ | $\Delta t$ | $\Delta W$ | $\Delta l$ | $\Delta w$ | $\Delta t$ | $\Delta W$ |
| 21-ply laminate with the combination according to the invention | 0 | 0 | 0 | +0.375 | 0 | 0 | 0 | +1.25 |
| Control laminate of the same thickness | +0.09 | +0.19 | +0.14 | +0.63 | +0.052 | +0.16 | +1.24 | +1.45 |

| TESTS | After 1,000 hours | | | | After 1,500 hours | | | |
|---|---|---|---|---|---|---|---|---|
| | $\Delta l$ | $\Delta w$ | $\Delta t$ | $\Delta W$ | $\Delta l$ | $\Delta w$ | $\Delta t$ | $\Delta W$ |
| 21-ply laminate with the combination according to the invention | +0.015 | 0 | +0.25 | +1.55 | +0.015 | 0 | +0.25 | +1.80 |
| Control laminate of the same thickness | +0.10 | +0.26 | +2.56 | +2.04 | | | | |

$\Delta l$ = Variation in % relative to the initial length
$\Delta w$ = Variation in % relative to the initial width
$\Delta t$ = Variation in % relative to the initial thickness
$\Delta W$ = Variation in % relative to the initial weight

EXAMPLE 4

30 g of diphenylsilanediol (containing 15.7% by weight of hydroxyl groups) were added to 70 g of prepolymer comprising imide functions prepared as indicated in Examples 1. The combination of these two powders was intimately mixed.

The mixture obtained was placed in a container which was then introduced into a ventilated oven. The oven was then heated for 45 minutes at 165° C. and then for 24 hours at 200° C.

After cooling, the resulting resin was ground until grains having a diameter of less than 100μ were obtained, and was then subjected to thermogravimetric analysis.

The operating conditions of the thermogravimetric analysis were as follows: balance was SETARAM B 60 type; sweep gas was air with a flow rate of 45 ml/minute; heating rate was 5° C./minute. The test consisted of 40 mg of resin.

The results of the analysis were: the resin did not show any loss in weight up to 282° C.; the temperature corresponding to a loss in weight of 5% was 334° C.; and temperature corresponding to a loss in weight of 10% was 362° C.

The resin can therefore withstand high temperatures without suffering substantial damage.

EXAMPLE 5

20 g of diphenylsilanediol (containing 15.7% by weight of hydroxyl groups) were added to 79.8 g of N,N'-4,4'-diphenylmethane-bis-malemide. The combination of these two powders was mixed in a container equipped with a mechanical stirring system.

The mixture was melted by heating it to a temperature of 145° C. and the heating was then continued at 155°-160° C. for 6 minutes, while the mechanical stirring was continued.

The liquid polymer thus obtained was then placed for 5 minutes in an enclosure in which a reduced pressure of 60 mm of Hg was established. The polymer was subsequently cast into an aluminum mold and then introduced into a ventilated oven preheated to 160° C. The polymer was subjected in the oven to the following baking cycle: 30 minutes at 160° C.; then 30 minutes at 170° C.; then 90 minutes at 180° C.; and finally 24 hours at 200° C.

After cooling, the resulting resin was ground until grains having a diameter of less than 100μ were obtained. The ground resin was then subjected to thermogravimetric analysis which showed the good heat stability exhibited by the resin.

The operating conditions at which the thermogravimetric analysis was carried out are those indicated in Example 4. The results of the analysis were: the resin did not shown any loss in weight of 5% was 386° C.; and the temperature corresponding to a loss in weight of 10% was 402° C.

While the invention has been described in terms of various preferred embodiments, the skilled artisan will appreciate that various modifications, substitutions, omissions and changes may be made without departing from the spirit thereof. Accordingly, it is intended that the scope of the present invention be limited solely by the scope of the following claims.

What is claimed is:

1. An imido polymer, comprising a copolymer of:
   (1) an imido monomer selected from the group consisting of (a) an oligo-imide having the structural formula (I):

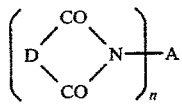 (I)

wherein D is a divalent radical selected from the group comprising those of the structural formulae:

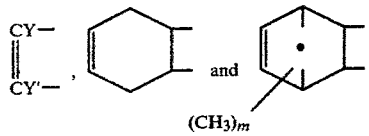

wherein Y and Y', which are identical or different, are each H, $CH_3$ or Cl and m is equal to 0 or 1, the symbol A represents an organic radical of valency n, containing up to 50 carbon atoms, and n represents a number equal to at least 1.5 and at most 5; (b) a mixture of an oligo-imide having the structural formula:

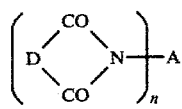 (I)

wherein D, A and n are as defined above, together with a polyamine of the structural formula (II):

 (II)

wherein G is an organic radical of valency z and z is an integer equal to at least 2; and (c) the reaction product of the said oligo-imide (I) with the said polyamine (II); with (2) an hydroxylated organosilicon comonomer comprising at least one hydroxyl function covalently bonded to a silicon atom.

2. The polymer as defined by claim 1, wherein the oligo-imide is a maleimide of the structural formula (III):

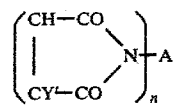 (III)

3. The polymer as defined by claims 1 or 2, wherein the imide monomer (1) comprises the admixture (b) and the polyamine is a bis-primary diamine of the structural formula (IV):

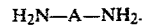 (IV)

4. The polymer as defined by claim 1 or 2, wherein the hydroxylated organosilicon comonomer (2) has the structural formula (V):

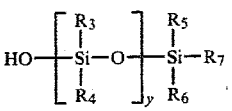 (V)

where $R_3$, $R_4$, $R_5$, $R_6$ and $R_7$, which are identical or different, are each selected from the group consisting of a hydroxyl group or a group of the formula $-OR_8$, in which $R_8$ is a linear or branched chain alkyl radical having from 1 to 6 carbon atoms or a phenyl radical; a hydrogen atom; a linear or branched chain alkyl radical having from 1 to 6 carbon atoms or such linear or branched chain alkyl radical substituted by one or more chloro, fluoro or cyano atoms; a linear or branched chain alkenyl radical having from 1 to 6 carbon atoms; and a phenyl radical or a phenyl radical which is substituted by one or more alkyl and/or alkoxy radicals having from 1 to 4 carbon atoms or by one or more chlorine atoms; and y is an integer or fraction thereof from 0 to 1,000.

5. The polymer as defined by claim 4, wherein the hydroxylated organosilicon monomer of the formula (V) displays a ratio by weight of hydroxyl groups within the molecule equal to at least 0.0005.

6. The polymer as defined by claim 5, said ratio being at least 0.001.

7. The polymer as defined by claim 4, wherein the hydroxylated organosilicon monomer has the structural formula (V):

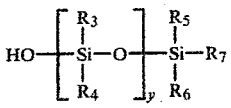 (V)

wherein $R_3$, $R_4$, $R_5$ and $R_6$, which are identical or different, are each selected from the group consisting of a linear or branched chain alkyl radical having from 1 to 6 carbon atoms, a linear or branched chain alkenyl radical having from 1 to 6 carbon atoms, and a phenyl radical, $R_7$ is a hydroxyl group and y is an integer or fraction thereof from 0 to 250.

8. The polymer as defined by claim 1, wherein the imido monomer (1) comprises the oligo-imide (a), said oligoimide being selected from the group consisting of N,N'-ethylene-bis-maleimide; N,N'-hexamethylene-bis-maleimide; N,N'-meta-phenylene-bis-maleimide; N,N'-para-phenylene-bis-maleimide; N,N'-4,4'-biphenylene-bis-maleimide; N,N'-4,4'-diphenylmethane-bis-maleimide; N,N'-4,4'-(diphenyl ether)-bis-maleimide; N,N'-4,4'-(diphenyl sulfide)-bis-maleimide; N,N'-4,4'-diphenylsulfone-bis-maleimide; N,N'-4,4'-dicyclohexylmethane-bis-maleimide; N,N'-α,α'-4,4'-dimethylenecyclohexane-bis-maleimide; N,N'-meta-xylylene-bis-maleimide; N,N'-para-xylylene-bis-maleimide; N,N'-4,4'-(1,1-diphenylcyclohexane)-bis-maleimide; N,N'-4,4'-diphenylmethane-bis-chloromaleimide; N,N'-4,4'-(1,1-diphenylpropane)-bis-maleimide; N,N'-4,4'-(1,1,1-triphenylethane)-bis-maleimide; N,N'-4,4'-triphenylmethane-bis-maleimide; N,N'-3,5-triazole-1,2,4-bis-maleimide; N,N'-dodecamethylene-bis-maleimide; N,N'-(2,2,4-trimethylhexamethylene)-bis-maleimide; N,N'-4,4-diphenylmethane-bis-citraconimide; 1,2-bis-(2-maleimidoethoxy)-ethane; 1,3-bis-(3-maleimidopropoxy)propane; N,N'-4,4'-benzophenone-bis-maleimide;

N,N'-pyridine-2,6-diyl-bis-maleimide; N,N'-naphthylene-1,5-bis-maleimide; N,N'-cyclohexylene-1,4-bis-maleimide; N,N'-5-methylphenylene-1,3-bis-maleimide and N,N'-5-methoxyphenylene-1,3-bis-maleimide.

9. The polymer as defined by claim 1, wherein the imido monomer (1) comprises the admixture (b), wherein said admixture the polyamine is selected from the group consisting of 4,4'-diaminodicyclohexylmethane; 1,4-diaminocyclohexane; 2,6-diaminopyridine; meta-phenylenediamine; para-phenylenediamine; 4,4'-diaminodiphenylmethane; 2,2-bis-(4-aminophenyl)propane; benzidine; 4,4'-diaminodiphenyl ether; 4,4'-diaminodiphenyl sulfide; 4,4'-diaminodiphenylsulfone; bis-(4-aminophenyl)-methylphosphine oxide; bis-(4-aminophenyl)-phenylphosphine oxide; N,N-(4-aminophenyl)-methylamine; 1,5-diaminonaphthalene; meta-xylylenediamine; para-xylylenediamine; 1,1-bis-(para-aminophenyl)-phthalene; hexamethylenediamine; 6,6'-diamino-2,2'-bypyridyl; 4,4'-diaminobenzophenone; 4,4'-diaminoazobenzene; bis-(4-aminophenyl)-phenylmethane; 1,1-bis-(4-aminophenyl)-cyclohexane; 1,1-bis-(4-amine-3-methylphenyl)-cyclohexane; 2,5-bis-(m-aminophenyl)-1,3,4-oxadiazole; 2,5-bis-(p-aminophenyl)-1,3,4-oxadiazole; 2,5-bis-(m-aminophenyl)-thiazolo[4,5-d]thiazole; 5,5'-di-(m-aminophenyl)-bis-(1,3,4-oxadiazolyl-2,2'); 4,4'-bis-(p-aminophenyl)-2,2'-bithiazole; m-bis-[4-(p-aminophenyl)-thiazol-2-yl]-benzene; 2,2'-bis-(m-aminophenyl)-5,5'-bibenzimidazole; 4,4'-diaminobenzanilide; phenyl-4,4'-diaminobenzoate; N,N'-bis-(4-aminobenzoyl)-p-phenylenediamine; 3,5-bis-(m-aminophenyl)-4-phenyl-1,2,4-triazole; 4,4'-[N,N'-bis-(p-aminobenzoyl)-diamino]-diphenylmethane; bis-p-(4-aminophenoxycarbonyl)-benzene; bis-p-(4-aminophenoxy)-benzene; 3,5-diamino-1,2,4-triazole; 1,1-bis-(4-aminophenyl)-1-phenylethane; 3,5-bis-(4-aminophenyl)pyridine; 1,2,4-triaminobenzene; 1,3,5-triaminobenzene; 2,4,6-triaminotoluene; 2,4,6-triamino-1,3,5-trimethylbenzene; 1,3,7-triaminonaphthalene; 2,4,4'-triaminobiphenyl; 2,4,6-triaminopyridine; 2,4,4'-triaminodiphenyl ether; 2,4,4'-triaminodiphenylmethane; 2,4,4'-triaminodiphenylsulfone; 2,4,4'-triaminobenzophenone; 2,4,4'-triamino-3-methyldiphenylmethane; N,N,N-tris-(4-aminophenyl)-amine; tris-(4-aminophenyl)methane; 4,4',4''-triaminotriphenylorthophosphate; tris-(4-aminophenyl)-phosphine oxide; 3,5,4'-triaminobenzanilide; melamine; 3,5,3',5'-tetraminobenzophenone; 1,2,4,5-tetraaminobenzene; 2,3,6,7-tetraaminonaphthalene; 3,3'-diaminobenzidine; 3,3',4,4'-tetraaminodiphenyl ether; 3,3',4,4'-tetraaminodiphenylmethane; 3,3',4,4'-tetraaminodiphenylsulfone; 3,5-bis-(3,4-diaminophenyl)-pyridine; and the oligomers of the structural formula:

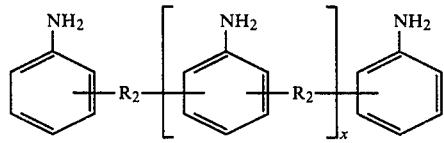

wherein R₂ is a divalent hydrocarbon radical having from 1 to 8 carbon atoms, and x is a number ranging from 0.1 to 2.

10. The polymer as defined by claims 8 or 9, wherein the hydroxylated organosilicon comonomer (2) is selected from the group consisting of diethylsilanediol; diphenylsilanediol; methylphenylsilanediol; 1,1,3,3-tetramethyldisiloxane-1,3-diol; 1,1-dimethyl-3,3-diphenyldisiloxane-13,-diol; 1,3-dimethyl-1,3-diphenyldisiloxane-1,3-diol; 1,1,3,3,5,5-hexamethyltrisiloxane-1,5-diol; 1,1,3,3,5,5,7,7-octamethyltetrasiloxane-1,7-diol; 1,1,3,3,5,5,7,7,9,9-decamethylpentasiloxane-1,9-diol; 1,1,3,3,5,5,7,7,9,9,11,11-dodecamethylhexasiloxane-1,11-diol; 1,3,5,7,9-pentamethyl-1,3,5,7,9-pentaphenyl-pentasiloxane-1,9-diol; and the higher homologues thereof.

11. A process for the preparation of a polymer as defined by claim 1, comprising heating an admixture of the reactants (1) and (2) to a temperature between 50° C. and 300° C.

12. The process as defined by claim 11, wherein the amounts of the reactants (1) and (2) in the admixture are selected such that the weight ratio

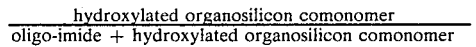

is between 0.05 and 0.8.

13. The process as defined by claim 12, said weight ratio being between 0.1 and 0.5.

14. The process as defined by claim 11, wherein the imido monomer (1) comprises the admixture (b) and wherein the amounts of the reactants are selected such that the weight ratio

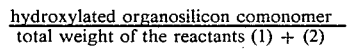

is between 0.05 and 0.8, and the ratio of the number of hydroxyl functions in the hydroxylated organosilicon comonomer to the number of amine functions in the polyamine is between 0.005 and 40.

15. The process as defined in claim 14, wherein the ratio

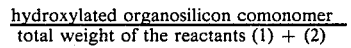

is between 0.1 and 0.5, and the ratio of the number of hydroxyl functions in the hydroxylated organosilicon comonomer to the number of amine functions in the polyamine is between 0.01 and 10.

16. A process as defined by any of claims 11, 12 or 14, comprising first heating the reactants (1) and (2) to a stage whereat there is formed a prepolymer (P) having a softening point of between 50° C. and 200° C., and thence curing said prepolymer (P) at a temperature between 150° C. and 300° C.

17. The process as defined by claim 14, comprising first heating the reactants (1) to a stage whereat there is formed, from all or part of the oligo-imide and of the polyamine, and in an amount of 1.2 to 5 imide groups per amine function, a prepolymer (PP) having a softening point of between 50° C. and 200° C., and thence admixing such prepolymer (PP) with the hydroxylated organosilicon comonomer and thermally converting such mixture to a prepolymer (P) also having a softening point of between 50° C. and 200° C.

18. A composition of matter comprising the prepolymer (PP) and hydroxylated organosilicon comonomer as defined in claim 17, said hydroxylated organosilicon comonomer comprising from 5% to 80% by weight of the total weight of the monomeric reactants.

19. The composition of matter as defined by claim 18, said hydroxylated organosilicon comonomer comprising from 10% to 50% by weight of the total weight of the monomeric reactants.

20. A shaped article comprising the imido copolymer as defined by claim 1.

21. A coated substrate, the coating thereon comprising the imido copolymer as defined by claim 1.

22. In a multi-ply laminate, the improvement which comprises, as the interlayers therefor, the imido copolymer as defined by claim 1.

23. A cellular shaped article comprising the imido copolymer as defined by claim 1.

24. The polymer as defined by claim 3 wherein the hydroxylated organosilicon comonomer (2) has the structural formula (V):

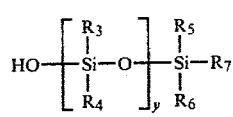

where $R_3$, $R_4$, $R_5$, $R_6$ and $R_7$, which are identical or different, are each selected from the group consisting of a hydroxyl group or a group of the formula $-OR_8$, in which $R_8$ is a linear or branched chain alkyl radical having from 1 to 6 carbon atoms or a phenyl radicals; a hydrogen atom; a linear or branched chain alkyl radical having from 1 to 6 carbon atoms or such linear or branched chain alkyl radical substituted by one or more chloro, fluoro or cyano atoms; a linear or branched chain alkenyl radical having from 1 to 6 carbon atoms; and a phenyl radical or a phenyl radical which is substituted by one or more alkyl and/or alkoxy radicals having from 1 to 4 carbon atoms or by one or more chlorine atoms; and y is an integer or fraction thereof from 0 to 1,000.

25. The polymer as defined by claim 24, wherein the hydroxylated organosilicon monomer of the formula (V) displays a ratio by weight of hydroxyl groups within the molecule equal to at least 0.0005.

26. The polymer as defined by claim 25, said ratio being at least 0.001.

27. The polymer as defined by claim 24, wherein the hydroxylated organosilicon monomer has the structural formula (V):

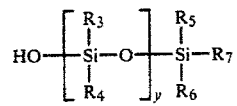

wherein $R_3$, $R_4$, $R_5$ and $R_6$, which are identical or different, are each selected from the group consisting of a linear or branched chain alkyl radical having from 1 to 6 carbon atoms, a linear or branched chain alkenyl radical having from 1 to 6 carbon atoms, and a phenyl radical, $R_7$ is a hydroxyl group and y is an integer or fraction thereof from 0 to 250.

28. An imido polymer, comprising a copolymer of:
(1) an imido monomer selected from the group consisting of (a) an oligo-imide having the structural formula (I):

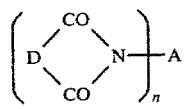

wherein D is a divalent radical selected from the group comprising those of the structural formulae:

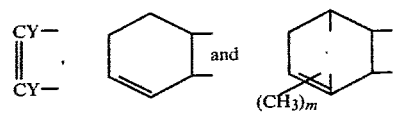

wherein Y and Y', which are identical or different, are each H, $CH_3$ or Cl and m is equal to 0 or 1; the symbol A denotes an alkylene radical having fewer than 13 carbon atoms, a phenylene or cyclohexylene radical or one of the radicals of the formulae:

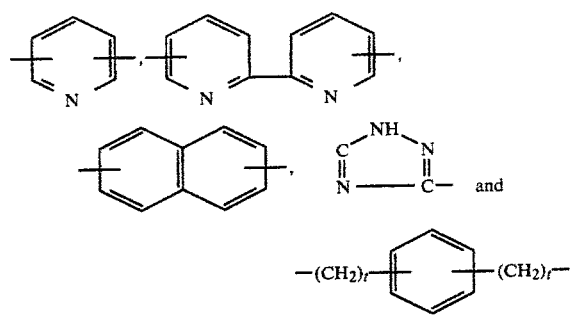

wherein t represents an integer from 1 to 3, or a divalent radical having from 12 to 30 carbon atoms which consists of phenylene or cyclohexylene radicals joined to one another by a single valence bond or by $-O-$, $-S-$, an alkylene group having from 1 to 3 carbon atoms, $-CO-$, $-SO_2-$, $-NR_1-$, $-N=N-$, $-CONH-$, $-P(O)-R_1-$, $-COH-N-X-NHCO-$,

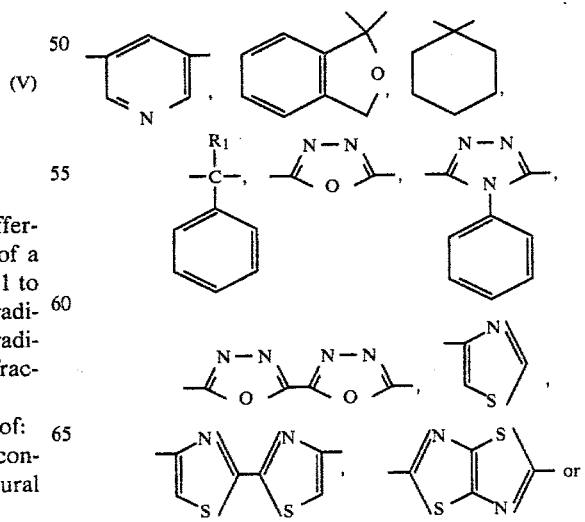

-continued

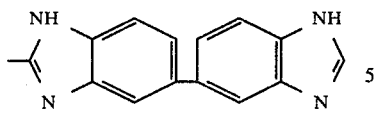

wherein $R_1$ represents a hydrogen atom, an alkyl radical having from 1 to 4 carbon atoms, a phenyl radical or cyclohexyl radical and X represents an alkylene radical having fewer than 13 carbon atoms, and n represents a number equal to at least 1.5 and at most 5; (b) a mixture of an oligo-imide having the structural formula:

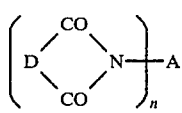 (I)

wherein D, A and n are as defined above, together with a polyamine of the structural formula (II):

$G(NH_2)_z$ (II)

wherein G is an organic radical of valency z and z is an integer equal to at least 2; and (c) the reaction product of the said oligo-imide (I) with the said polyamine (II); with (2) an hydroxylated organosilicon comonomer comprising at least one hydroxyl function covalently bonded to a silicon atom.

29. The polymer as defined by claim 28 wherein the hydroxylated organosilicon comonomer (2) has the structural formula (V):

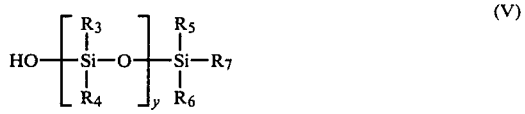 (V)

where $R_3$, $R_4$, $R_5$, $R_6$ and $R_7$, which are identical or different, are each selected from the group consisting of a hydroxyl group and a group of the formula $—OR_8$, in which $R_8$ is a linear or branched chain alkyl radical having from 1 to 6 carbon atoms or a phenyl radical; a hydrogen atom; a linear or branched chain alkyl radical having from 1 to 6 carbon atoms or such linear or branched chain alkyl radical substituted by one or more chloro, fluoro or cyano atoms; a linear or branched chain alkenyl radical having from 1 to 6 carbon atoms; and a phenyl radical or a phenyl radical which is substituted by one or more alkyl and/or alkoxy radicals having from 1 to 4 carbon atoms or by one or more chlorine atoms; and y is an integer or fraction thereof from 0 to 1,000.

* * * * *